US012767076B2

(12) United States Patent
Nagasawa

(10) Patent No.: US 12,767,076 B2
(45) Date of Patent: Oct. 20, 2026

(54) VEHICLE BODY FRONT STRUCTURE

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 430 days.

(21) Appl. No.: 18/469,987

(22) Filed: Sep. 19, 2023

(65) Prior Publication Data

US 2024/0109504 A1 Apr. 4, 2024

(30) Foreign Application Priority Data

Oct. 4, 2022 (JP) ................................ 2022-160600

(51) Int. Cl.
*B60R 19/18* (2006.01)
*B60R 19/24* (2006.01)
*B62D 25/08* (2006.01)

(52) U.S. Cl.
CPC ............. *B60R 19/18* (2013.01); *B62D 25/08* (2013.01); *B60R 2019/1806* (2013.01); *B60R 2019/247* (2013.01)

(58) Field of Classification Search
CPC ............ B60R 19/18; B60R 2019/1806; B60R 2019/247; B60R 19/34; B62D 21/15; B62D 25/08; B62D 21/152
See application file for complete search history.

(56) References Cited

U.S. PATENT DOCUMENTS 8,702,158 B2 * 4/2014 Kihara et al. .......... B62D 25/08 296/203.02
11,077,881 B2 * 8/2021 Matsuda .............. B62D 21/157
(Continued)

FOREIGN PATENT DOCUMENTS

JP 4501267 B2 * 7/2010 ............. B60R 19/04
JP 2015137080 A * 7/2015 ............. B60R 19/24
(Continued)

OTHER PUBLICATIONS

Notice of Reasons for Refusal mailed May 26, 2026 for Japanese Patent Application No. 2022-160600 (2 pages in Japanese; 3 pages English translation).

*Primary Examiner* — Carly W. Lynch
(74) *Attorney, Agent, or Firm* — Smith, Gambrell & Russell, LLP

(57) ABSTRACT

A vehicle body front structure includes front side frames extending in a front-rear direction of a vehicle on both sides in a vehicle width direction, a cross-member joined to the front side frames, and a bumper beam joined to the front side frames, Hall triangular reinforcements including a bottom portion joined to the bumper beam and a tip portion protruding toward an inner rear side of the vehicle, and Hall fixing brackets fixing the reinforcement to the front side frames. The tip portion of each reinforcement has a D-shape including a rounded shape extending in an up-down direction of the vehicle, and an axial direction of each reinforcement fixed to the front side frame intersects an outer surface of the front side frame in the vehicle width direction on a side closer to the front of the vehicle than a joined portion between each front side frame and the cross-member.

18 Claims, 5 Drawing Sheets

(56) References Cited

U.S. PATENT DOCUMENTS

| | | | | |
|---|---|---|---|---|
| 2012/0248820 | A1* | 10/2012 | Yasui | B62D 25/08 296/187.09 |
| 2013/0199864 | A1* | 8/2013 | Enning | B62D 21/152 180/271 |
| 2013/0320709 | A1* | 12/2013 | Kuwabara | B62D 21/152 |
| 2014/0008923 | A1* | 1/2014 | Han | B60R 19/18 |
| 2014/0091585 | A1* | 4/2014 | Ramoutar | B60R 19/26 293/133 |
| 2015/0246691 | A1* | 9/2015 | Volz | B62D 21/152 |
| 2015/0251702 | A1* | 9/2015 | Volz | B62D 21/152 |
| 2016/0059810 | A1* | 3/2016 | Watanabe | B60R 19/34 |
| 2016/0121931 | A1* | 5/2016 | Tamaoki | B62D 21/152 |
| 2016/0318469 | A1* | 11/2016 | Matsumoto | B60R 19/34 |
| 2017/0210425 | A1* | 7/2017 | Sekiguchi | B62D 21/15 |
| 2019/0299889 | A1* | 10/2019 | Wada | B60R 19/34 |
| 2021/0086835 | A1* | 3/2021 | Serada | B62D 21/155 |
| 2021/0114664 | A1* | 4/2021 | Baccouche | B62D 21/152 |
| 2021/0402940 | A1* | 12/2021 | Shah | B60R 19/00 |
| 2023/0001870 | A1* | 1/2023 | Matecki | B60R 19/34 |
| 2023/0099466 | A1* | 3/2023 | Inami | B60R 19/18 |

FOREIGN PATENT DOCUMENTS

| | | | | | |
|---|---|---|---|---|---|
| JP | 2017030700 | A | * | 2/2017 | B62D 21/152 |
| JP | 2017047780 | A | * | 3/2017 | B60R 19/04 |
| JP | 6339838 | B2 | * | 6/2018 | B60R 19/24 |
| JP | 2021054389 | A | * | 4/2021 | B60R 19/04 |
| WO | WO-2014173476 | A1 | * | 10/2014 | B62D 21/15 |

* cited by examiner

VEHICLE BODY FRONT STRUCTURE

CROSS-REFERENCE TO RELATED APPLICATIONS

The present application claims priority from Japanese Patent Application No. 2022-160600 filed on Oct. 4, 2022, the entire contents of which are hereby incorporated by reference.

BACKGROUND

The disclosure relates to a vehicle body front structure.

Generally, an effective countermeasure for frontal collisions of a vehicle is in not deforming a cabin, namely an occupant space, with the intent to reduce damages of occupants, and various expedients are proposed from that point of view. As one of those expedients, a structure for absorbing collision energy by structural members positioned in front of the cabin has been widely used in recent years.

On the other hand, when a vehicle is, for example, a hybrid electric vehicle (HEV) or an electric vehicle (EV), a battery pack serving as a power source of the vehicle is mounted on a floor surface under the cabin in some cases.

Electric power for driving the vehicle is accumulated in the battery pack. Therefore, if deformation or disconnection generates in the battery pack upon, for example, the frontal collisions of the vehicle, there is a risk that an abrupt abnormal reaction may occur.

Under the above-described situation, when the vehicle is, for example, the HEV or the EV, significance of a structure not deforming the cabin has increased from the viewpoint of not damaging the battery pack.

Furthermore, regarding the frontal collisions of the vehicle, consideration is to be paid to various modes of collisions, such as a full-wrap collision in which the vehicle collides at its entire front side with a collision object, an offset collision in which the vehicle collides at its one front side with a collision object, and a small overlap collision in which an offset rate is about 25%.

Thus, there is a demand for a structure capable of absorbing the collision energy by structural members positioned in front of the cabin or the battery pack and capable of not deforming the cabin and the battery pack in any of those collision modes.

To meet the above-mentioned demand, a structure is proposed (see, for example, Japanese Unexamined Patent Application Publication (JP-A) No. 2017-047780) which comprises a bumper reinforcement (bumper beam) extending in a vehicle width direction on a front side in a vehicle, a pair of left and right side rails (front side frames) extending in a front-rear direction of the vehicle on an outer side in the vehicle width direction, and braces (reinforcements) each joined to the bumper beam at a position on an outer side in the vehicle than the front side frame. When the collision energy generates in the event of the small overlap collision, the reinforcement is brought into engagement with a load bearing portion disposed in the front side frame and transmits a load to the front side frame on an opposite side in the vehicle width direction through a cross-member.

SUMMARY

An aspect of the disclosure provides a vehicle body front structure. The vehicle body front structure includes front side frames front side frames in a pair, a cross-member, a bumper beam, reinforcements, and fixing brackets. The front side frames extend in a front-rear direction of a vehicle on both sides of a front of the vehicle in a vehicle width direction. The cross-member extends in the vehicle width direction on a front side of the vehicle and is joined to the front side frames. The bumper beam is joined to respective vehicle front-side ends of the front side frames, extends in the vehicle width direction, and includes both end portions serving as bent portions toward a rear side of the vehicle. The reinforcements have a triangular shape and each include a bottom portion joined to the bumper beam and a tip portion protruding toward an inner rear side of the vehicle. The fixing brackets fix the reinforcements to the front side frames respectively. The tip portion of each of the reinforcements has a D-shape including a rounded shape that extends in an up-down direction of the vehicle. An axial direction of each of the reinforcements fixed to a corresponding one of the front side frames intersects an outer surface of the corresponding one of the front side frames in the vehicle width direction at a position on a side closer to the front of the vehicle than a joined portion between the corresponding one of the front side frames and the cross-member.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

FIG. 4A is a plan view before the collision, and FIGS. 4B and 4C are plan views illustrating the deformation in the event of the frontal collision in time series; FIG. 5A is a plan view before the collision, and FIGS. 5B and 5C are plan views illustrating the deformation in the event of the frontal collision in time series.

DETAILED DESCRIPTION

Figure 1:
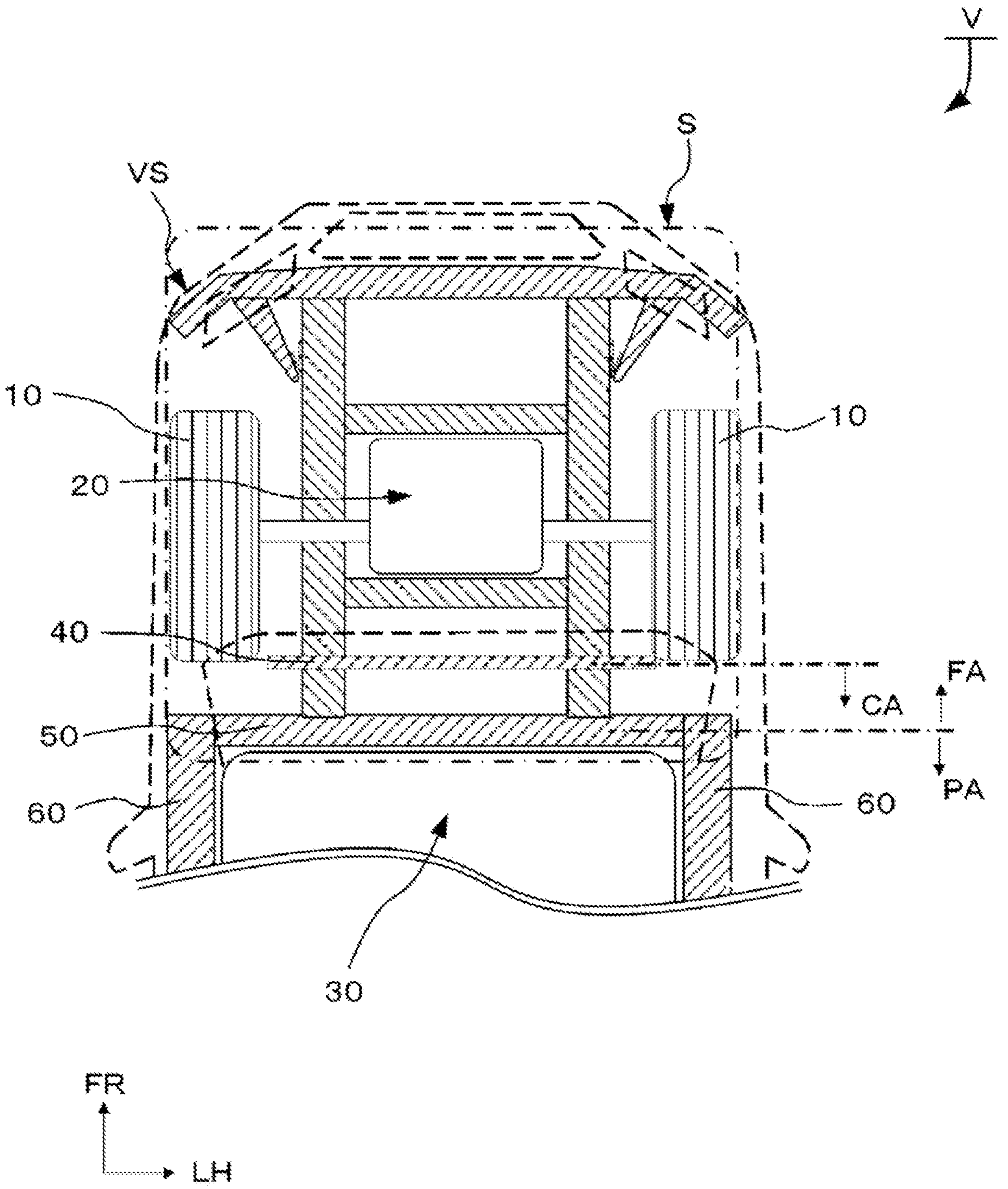
FIG. 1 is a schematic view when a vehicle according to an embodiment of the disclosure is viewed from above.

According to the technique disclosed in JP-A No. 2017-047780, the reinforcement transmits the collision energy generated in the event of the small overlap collision to the front side frame and the cross-member with the reinforcement pushing the load bearing portion disposed in the front side frame, and a transmission direction of the collision energy is limited to a rear or lateral rear side. This leads to a possibility that the collision energy is not efficiently distributed and transmitted.

It is desirable to provide a vehicle body front structure capable of suppressing deformations of a cabin and a battery pack in any of multiple frontal collision modes.

A vehicle V to which a vehicle body front structure S according to an embodiment is applied will be described below with reference to FIGS. 1 to 5C. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. An arrow FR illustrated in the drawings denotes the front of the vehicle V illustrated in FIG. 1, an arrow UP denotes an upper side when the vehicle is viewed from the front, and an arrow LH denotes the left when the vehicle is viewed from the front. In the following description, when the description is made using words "up-down, front-rear, and left-right directions", those words are assumed to indicate, unless otherwise specified, the up-down direction, the front-rear direction, and the left-right direction when viewed from the front, respectively.

Embodiment

The vehicle body front structure S included in the vehicle V, according to the embodiment, is described with reference to FIGS. 1 to 3.

Configuration of Vehicle V

The vehicle V is, for example, an EV using a power unit 20 as a drive source. In another example, the vehicle V may be a HEV using multiple drive sources, such as an engine and the power unit 20.

As illustrated in FIG. 1, the vehicle V includes, inside a vehicle body VS, front wheels 10, the power unit 20, a battery pack 30, a toe board 40, a torque box 50, side sills 60, and the vehicle body front structure S (members denoted by hatching in an area surrounded by a one-dot-chain line in FIG. 1).

The power unit 20 is a drive device constituted by a motor, a transmission, a clutch, a drive shaft, and so on (not illustrated) for driving the front wheels 10. The power unit 20 is installed in a space surrounded by front side frames 100 and cross-members 110A and 110B (described later) and is fixed in a state mounted on an upper surface side of the front side frames 100.

The battery pack 30 is formed in the shape of a flat box, for example. Many battery cells are coupled in series inside the battery pack 30 to be capable of outputting a high voltage supplied to the power unit 20 and accumulating electric power enough for driving the vehicle V to run. The battery pack 30 is installed in a space surrounded by robust frames (described later), such as the torque box 50 and the side sills 60. The battery pack 30 is utilized in vehicles, such as the EV and the HEV.

The toe board 40 is a partition wall that is disposed to rise in the up-down direction of the vehicle on a vehicle front side of a cabin CA and to partition a front wheel drive and the cabin CA of the vehicle V. The toe board 40 is joined to an upper rear side of each of the front side frames 100 (described later) by welding, for example.

The torque box 50 is interposed between the front side frames 100 and the side sills 60 (described later) and couples the front side frames 100 and the side sills 60. The torque box 50 serves as a skeleton extending on a bottom surface of the vehicle V in the vehicle width direction and is joined to one end of each of the front side frames 100 on left and right sides relative to the torque box 50 by welding, for example. The torque box 50 is made of, for example, a metal with high rigidity and has a substantially rectangular enclosed shape in cross-section. The torque box 50 is positioned in front of the battery pack 30, and end portions of the torque box 50 are joined to respective one ends of the side sills 60 on the left and right sides relative to the torque box 50 by welding, for example.

Furthermore, the respective one ends of the front side frames 100 (described later) on the left and right sides relative to the torque box 50 are joined to a front surface side and an upper surface side of the torque box 50 by welding, for example.

An area behind the torque box 50 is a protection area PA. Deformations of the cabin CA positioned above the protection area PA and the battery pack 30 positioned under the protection area PA are suppressed in the protection area PA.

The side sills 60 are disposed on a lateral bottom surface of the vehicle on both sides in the vehicle width direction. Each of the side sills 60 serves as skeleton extending in the front-rear direction, is made of, for example, a metal with high rigidity, and has a substantially rectangular enclosed shape in cross-section. The side sills 60 constitute bottoms of the protection area PA on both sides thereof.

The vehicle body front structure S is constituted inside a vehicle front compartment FA forward of the torque box 50. Details of the vehicle body front structure S are described below.

Details of Vehicle Body Front Structure S

The vehicle body front structure S according to the embodiment is described with reference to FIGS. 2 and 3.

The vehicle body front structure S is constituted to be bilaterally symmetric in the vehicle width direction.

Figure 2:
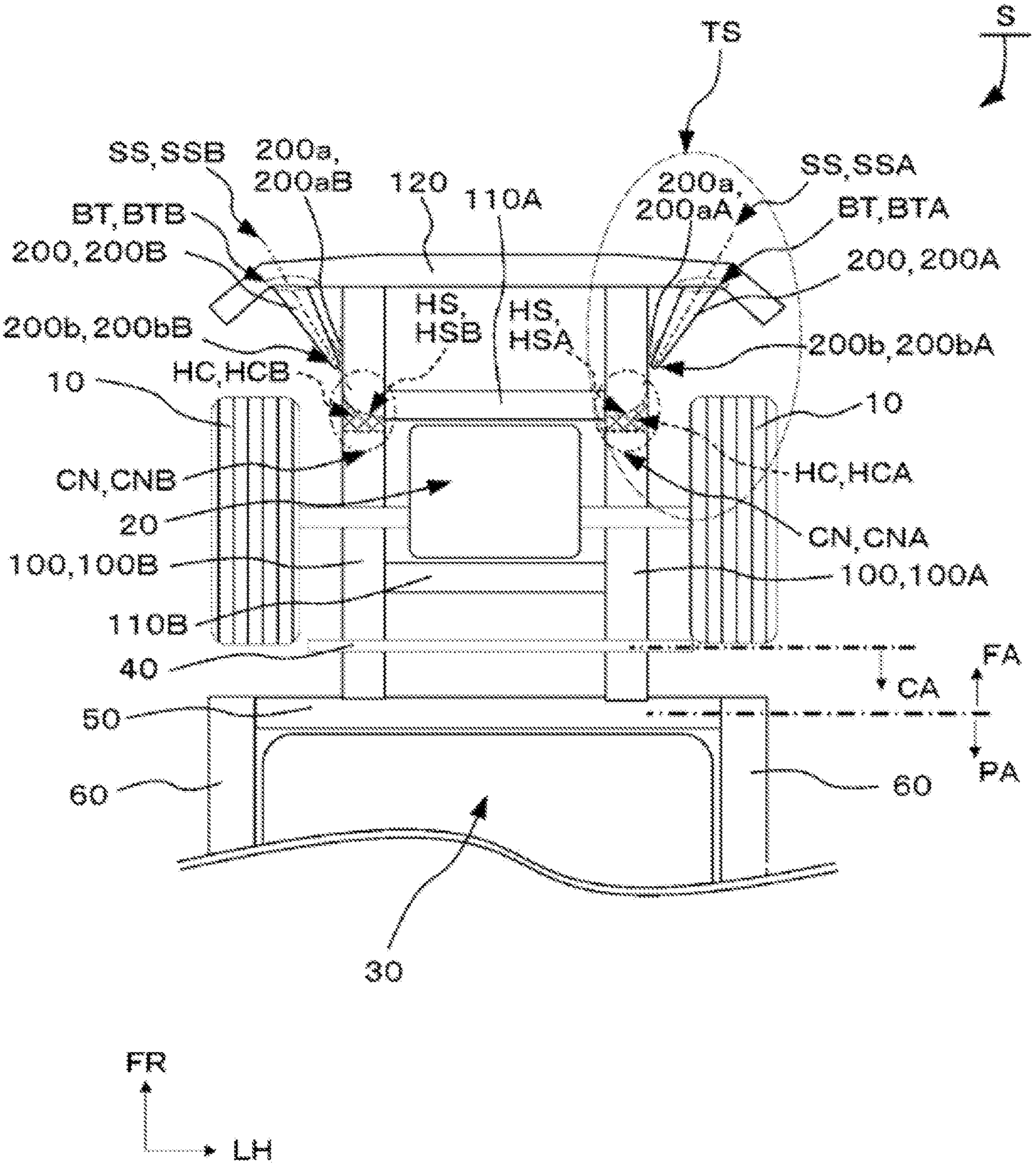
FIG. 2 is a schematic view when a vehicle body front structure illustrated in FIG. 1 is viewed from above.

As illustrated in FIG. 2, the vehicle body front structure S includes the front side frames 100 (front side frames 100A and 100B), the cross-members 110 (cross-members 110A and 110B), a bumper beam 120, and reinforcements 200 (reinforcements 200A and 200B).

Front Side Frames 100

The front side frames 100 are disposed in pair on both the sides in the vehicle width direction, are each positioned on a lateral surface side of the power unit 20 to drive the front wheels 10 of the vehicle V, and extend in the front-rear direction of the vehicle. Each of the front side frames 100 constitutes a skeleton of the vehicle V, is made of, for example, a metal with high rigidity, and has a substantially rectangular enclosed shape in cross-section. Vehicle front-side ends of the front side frames 100 are joined to the bumper beam 120 by welding, for example, and vehicle rear-side ends of the front side frames 100 are joined to the torque box 50 by welding, for example.

Figure 3:
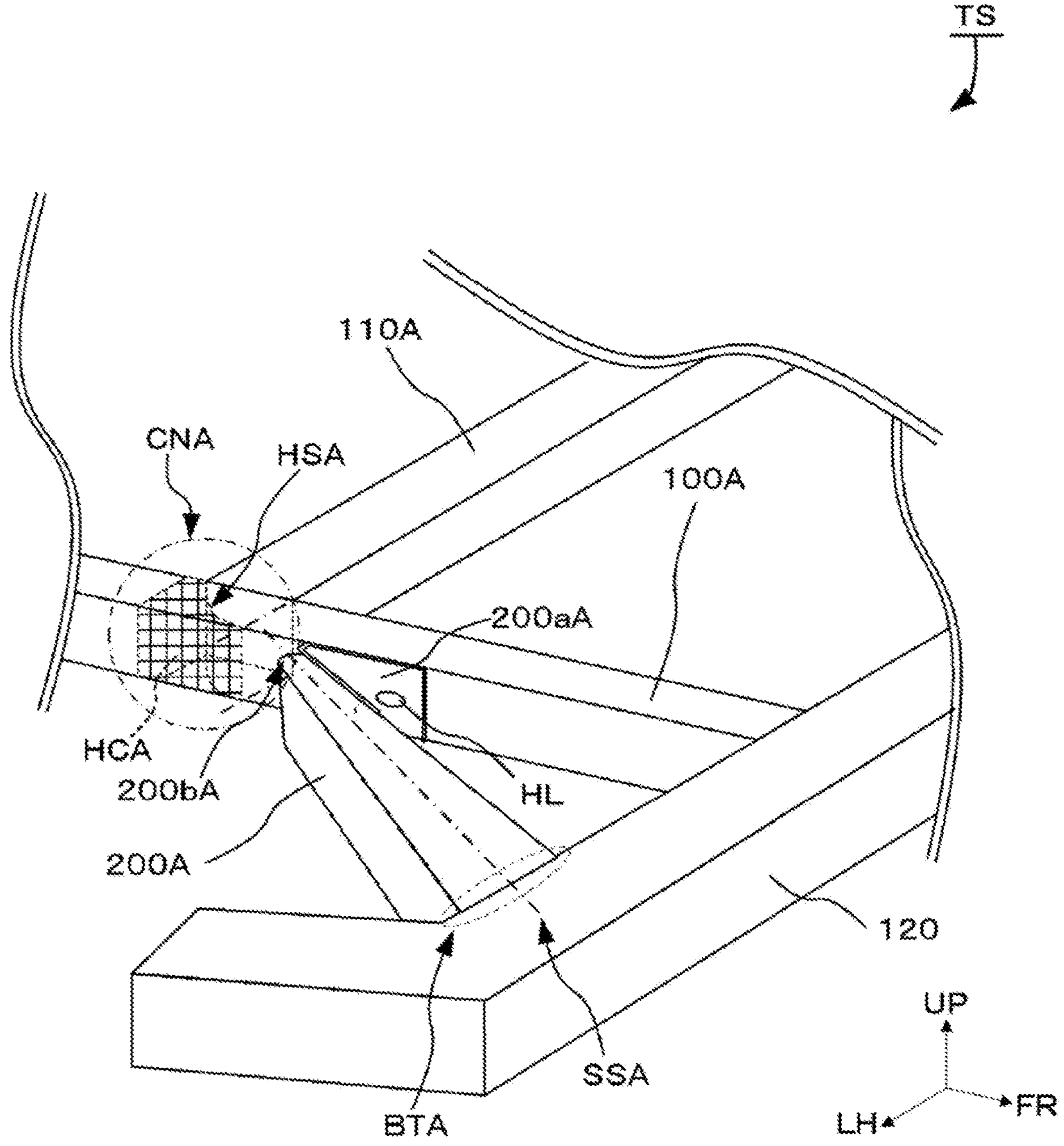
FIG. 3 is a perspective view when a section denoted by TS, illustrated in FIG. 2, is viewed from above in a state in which a power unit and front wheels are removed.

As illustrated in FIG. 3, the front side frames 100 include reinforcing members HC (reinforcing members HCA and HCB) that are disposed in joined portions CN (joined portions CNA and CNB) between the front side frames 100 and the cross-member 110A to extend from a vehicle rear-side position of the joined portion toward the inside of the joined portion. The reinforcing members HC are made of, for example, a metal or hard resin and are disposed within the front side frames 100. The reinforcing members HC have recesses HS (recesses HSA and HSB) each spanning from a front-side outer surface of the front side frame 100 in the vehicle width direction to a rear-side inner surface of the front side frame 100 in the vehicle width direction. In more detail, the reinforcing member HC has the recesses HS each being in an arc shape and interconnecting a line at which an extension of a vehicle front-side surface of the cross-member 110A and a vehicle front-side outer surface of the front side frame 100 intersect and a line at which a vehicle rear-side surface of the cross-member 110A and a vehicle rear-side inner surface of the front side frame 100 intersect.

Cross-Members 110

As illustrated in FIG. 2, the cross-members 110A and 110B extend between the front side frames 100 that are disposed on both the sides in the vehicle width direction. The cross-member 110A is disposed on vehicle front-side portions of the front side frames 100, and the cross-member 110B is disposed on vehicle rear-side portions of the front side frames 100. Each of the cross-members 110A and 110B is made of, for example, a metal and has a substantially rectangular enclosed shape in cross-section. Ends of the cross-members 110A and 110B are joined to the front side frames 100 on both the sides in the vehicle width direction by welding, for example.

Bumper Beam 120

The bumper beam 120 extends in the vehicle width direction in a front end portion of the vehicle and constitutes a skeleton in the front end portion of the vehicle. The bumper beam 120 is made of, for example, a metal and has a substantially rectangular enclosed shape in cross-section. The bumper beam 120 is joined to vehicle front-side ends of the front side frames 100 on both the sides in the vehicle width direction by welding, for example, and portions of the bumper beam 120 on an outer side than its joined portions to the front side frames 100 in the vehicle width direction are bent toward the rear side in the vehicle. Moreover, a central portion of the bumper beam 120 in the vehicle width direction is curved such that the central portion has a convex shape curved toward the front of the vehicle in a plan view.

In the vehicle body front structure S, robust well-shaped skeletons are formed by a combination of the front side frames 100 on both the sides in the vehicle width direction, the cross-members 110A and 110B disposed respectively in front and rear of the power unit 20, the bumper beam 120, the torque box 50, and the side sills 60.

Reinforcements 200

As illustrated in FIG. 3, each of the reinforcements 200 has a substantially triangular shape and includes a bottom portion BT (bottom portion BTA or BTB) joined to the bumper beam 120 by welding, for example, and a tip portion 200*b* (tip portion 200*b*A or 200*b*B) protruding toward an inner rear side of the vehicle. The reinforcement 200 is made of, for example, a metal and has an enclosed cross-section in a substantially triangular shape in a plan view, the triangular shape being formed by one side, namely the bottom portion BT on the front side in the vehicle, and two sides extending toward the inner rear side of the vehicle and being longer than the bottom portion BT. The tip portion 200*b* extends towards the joined portion CN. The tip portion 200*b* has a D-shape including an R-shape (rounded shape) that extends in the up-down direction of the vehicle.

A fixing bracket 200*a* (fixing bracket 200*a*A or 200*a*B) for fixing the reinforcement 200 to the front side frame 100 is fixedly disposed on a vehicle rear-side inner surface of the reinforcement 200 by welding, for example. The fixing bracket 200*a* is formed of, for example, a steel sheet and has the shape of a substantially rectangular flat plate. The fixing bracket 200*a* is folded back at the tip portion 200*b* of the reinforcement 200 toward the front side in the vehicle. An elongate hole HL with a lengthwise direction being the front-rear direction of the vehicle is formed in the fixing bracket 200*a* to penetrate therethrough in a thickness direction. The reinforcement 200 is fixed to the front side frame 100 by inserting, for example, a bolt into the elongate hole HL of the fixing bracket 200*a* and fastening the bolt, thus fixing the reinforcement 200 to the front side frame 100. A gap is formed between the tip portion 200*b* and the front side frame 100. In addition, an axial direction SS (axial direction SSA or SSB) of the reinforcement 200 fixed to the front side frame 100, the axial direction SS being oriented toward the inner rear side of the vehicle, intersects the outer surface of the front side frame 100 in the vehicle width direction at a position on a side closer to the front of the vehicle than the reinforcing member HC.

Operation and Advantageous Effects

With the above-described vehicle body front structure S according to the embodiment, when frontal collisions of the vehicle V with a collision object occur, collision energy is absorbed in the vehicle body front structure S, and deformations of the cabin CA and the battery pack 30 disposed in the protection area PA are suppressed.

In the event of the full-wrap collision, impact absorbing structures on both sides in the vehicle width direction work. In the events of the offset collision and the small overlap collision, the impact absorbing structure on a side where the collision has occurred works mainly. The action working in the event of the full-wrap collision will be described below with reference to FIGS. 4A, 4B, and 4C.

Case of Full-Wrap Collision

Figure 4A:
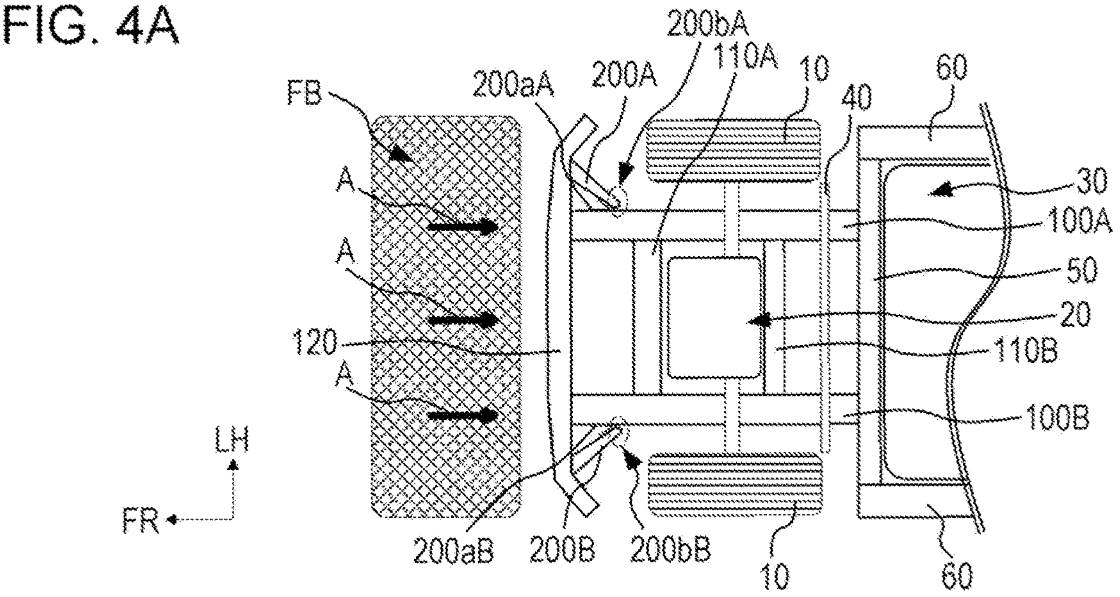
FIGS. 4A, 4B, and 4C are each a plan view of the vehicle body front structure according to the embodiment of the disclosure when a deformation of the vehicle body front structure in the event of the full-wrap collision is viewed from above; namely.

When the frontal collision of the vehicle V with a collision object FB occurs, the collision energy generates in a direction denoted by an arrow A. In the event of the full-wrap collision, as illustrated in FIG. 4A, the collision object FB hits on the vehicle V from the front, and the collision energy generates in the direction denoted by the arrow A.

Figure 4B:
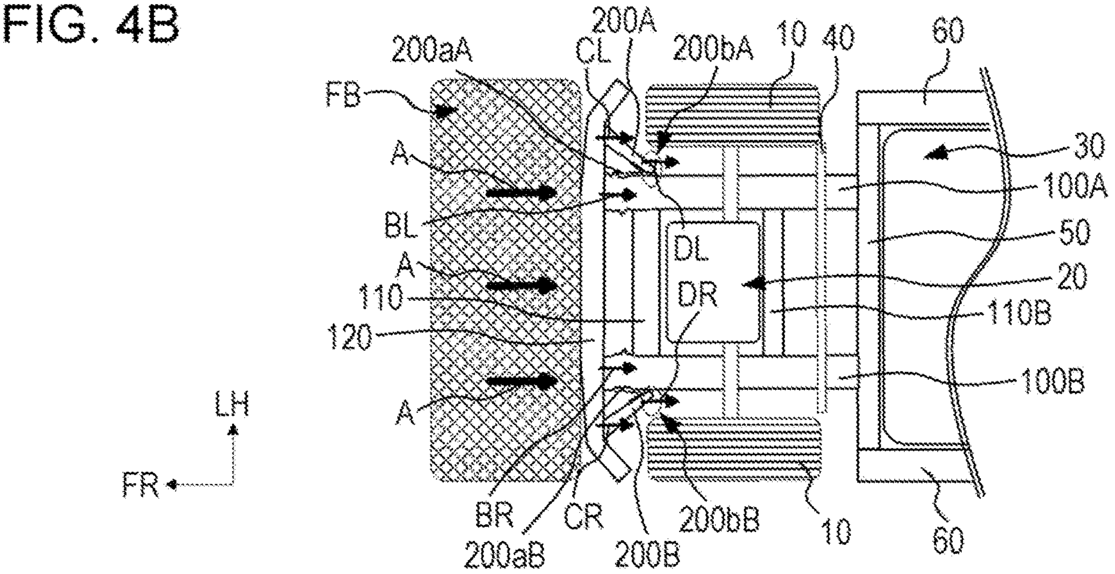

As illustrated in FIG. 4B, the collision energy applied from the front, denoted by the arrow A, is transmitted to the front side frames 100 and the reinforcements 200 through the bumper beam 120. To the front side frames 100, the collision energy denoted by arrows B (arrows BL and BR) is transmitted from the front side toward the rear side in the vehicle. Front end portions of the front side frames 100 are collapsed by the collision energy, and the collision energy is absorbed by the deformations of the front end portions of the front side frames 100.

With the progress of the collapse of each front side frame 100, the collision energy in a direction denoted by an arrow C (arrow CL or CR) is transmitted to the reinforcement 200. At that time, due to the collision energy in the direction denoted by the arrow B and the collision energy in the direction denoted by the arrow C, the collision energy toward the rear side in the vehicle is transmitted to the fixing bracket 200*a* of the reinforcement 200. Accordingly, the reinforcement 200 and the fixing bracket 200*a* are pushed in a direction denoted by an arrow D (arrow DL or DR). Because the tip portion 200*b* of the reinforcement 200 has the D-shape, the tip portion 200*b* is smoothly pushed in the direction of the arrow D along the outer surface of the front side frame 100 in the vehicle width direction. Furthermore, the fixing bracket 200*a* is forced to slide toward the rear side in the vehicle and is ruptured at the elongate hole HL at which the fixing bracket 200*a* is fixed by the bolt, for example. Hence the fixing bracket 200*a* is detached from the front side frame 100, and the reinforcement 200 does not anymore take part in the absorption of the collision energy because of loss of a fixing shaft.

Figure 4C:
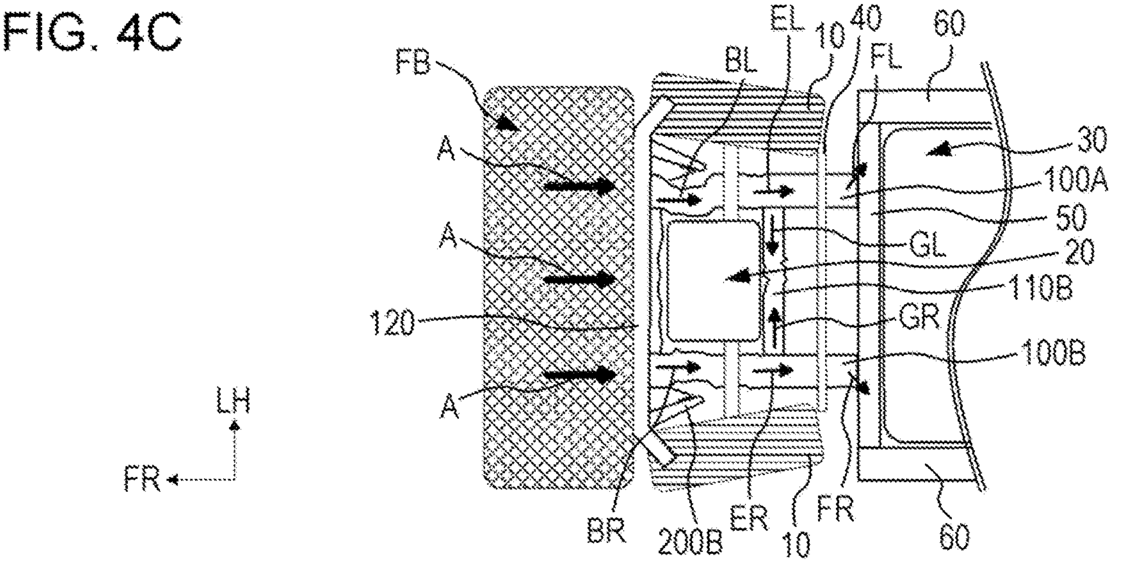

With a further increase of the collision energy, as illustrated in FIG. 4C, the collapse of the front side frames 100 progresses up to the position of the cross-member 110A on the front side in the vehicle, and the collision energy is absorbed by the deformations of the front side frames 100. Furthermore, the collision energy transmitted to the front side frames 100, denoted by the arrows B and arrows E (arrows EL and ER), is transmitted to the cross-members 110A and 110B disposed respectively in front and rear of the power unit 20 and to the torque box 50. The collision energy in directions denoted by arrows G (arrows GL and GR) is transmitted to the cross-member 110B that is disposed behind the power unit 20 on a side closer to the rear of the vehicle, whereupon the cross-member 110B is collapsed. Moreover, the collision energy transmitted to the torque box 50, denoted by arrows F (arrows FL and FR), is distributed to the side sills 60.

As described above, the reinforcement 200 and the fixing bracket 200*a* do not anymore take part in the absorption of the collision energy because of the loss of the fixing shaft. Thus, the collision energy is transmitted to the robust well-shaped skeletons that are formed by joining the front side frame 100A and the front side frame 100B on both the sides in the vehicle width direction, the cross-member 110A and the cross-member 110B disposed respectively in front and rear of the power unit 20, the bumper beam 120, the torque box 50, and the side sills 60. Hence the collision energy is distributed to the well-shaped skeletons and is absorbed by the deformations of the well-shaped skeletons.

When input of the collision energy is ended and the transmission of the collision energy to the front side frames 100 is ended, the absorption of the collision energy due to the deformation of the vehicle body front structure S is ended.

Case of Small Overlap Collision

Figure 5A:
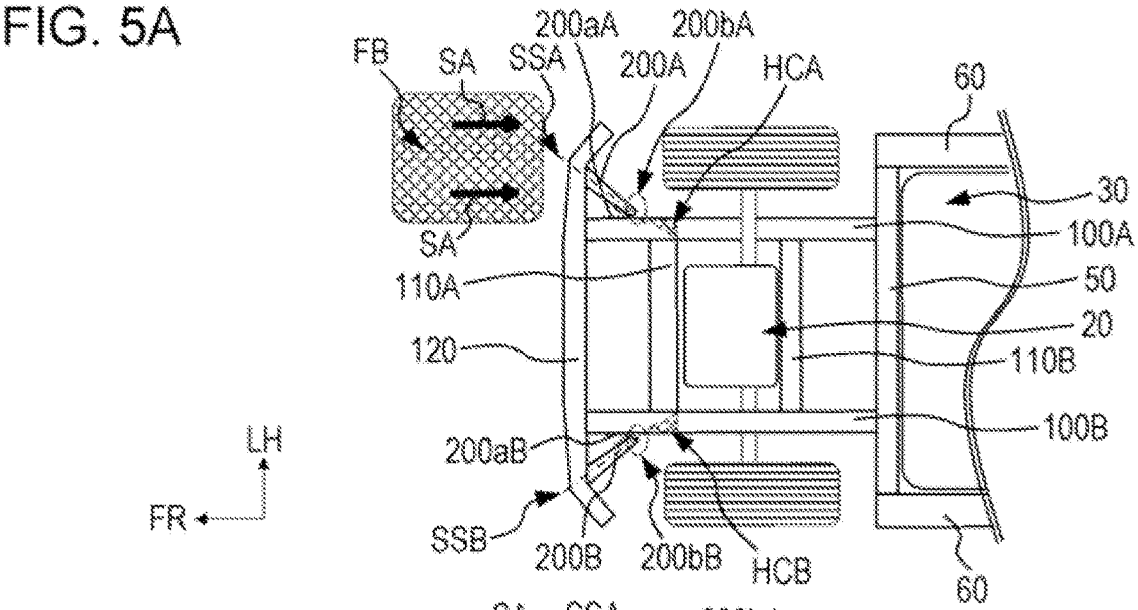
FIGS. 5A, 5B, and 5C are each a plan view of the vehicle body front structure according to the embodiment of the disclosure when a deformation of the vehicle body front structure in the event of the small overlap collision is viewed from above; namely.

The case of collision on the left side of the vehicle V when viewed from the front will be described with reference to FIGS. 5A, 5B, and 5C. In the event of the small overlap collision, as illustrated in FIG. 5A, the collision objects FB hits on either the left or right side of the vehicle V, and the collision energy generates in a direction denoted by an arrow SA.

Figure 5B:
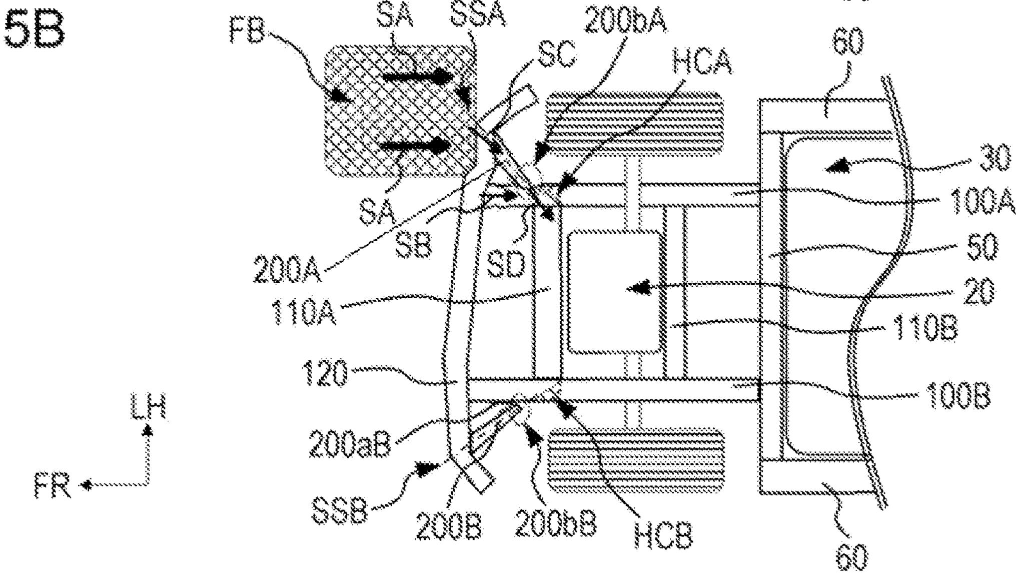

As illustrated in FIG. 5B, the collision energy applied from the direction denoted by the arrow SA is transmitted to the front side frame 100 and the reinforcement 200 through the bumper beam 120 from directions denoted by an arrow SB and an arrow SC. To the front side frame 100, the collision energy denoted by the arrow SB is transmitted toward the rear side in the vehicle. The vehicle front-side portion of the front side frame 100 is collapsed by the collision energy, and the collision energy is absorbed by the deformation of the vehicle front-side portion of the front side frame 100.

To the reinforcement 200, the collision energy in the direction denoted by the arrow SC is transmitted from the bumper beam 120. The collision energy denoted by an arrow SD is transmitted to the tip portion 200*b* of the reinforcement 200. Because a direction denoted by the arrow SD is substantially the same as the axial direction SS of the reinforcement 200 oriented toward the inner rear side of the vehicle, the collision energy acting to deform the front side frame 100 is transmitted to the tip portion 200*b* of the reinforcement 200. Moreover, because the axial direction SS of the reinforcement 200 is oriented to a position closer to the front side in the vehicle than the reinforcing member HC, the tip portion 200*b* of the reinforcement 200 is brought into contact with the recess HS of the reinforcing member HC disposed within the front side frame 100 while deforming the front side frame 100. The reinforcement 200 is guided to move toward the rear side in the vehicle with the presence of the recess HS while the front side frame 100 is further collapsed.

Figure 5C:
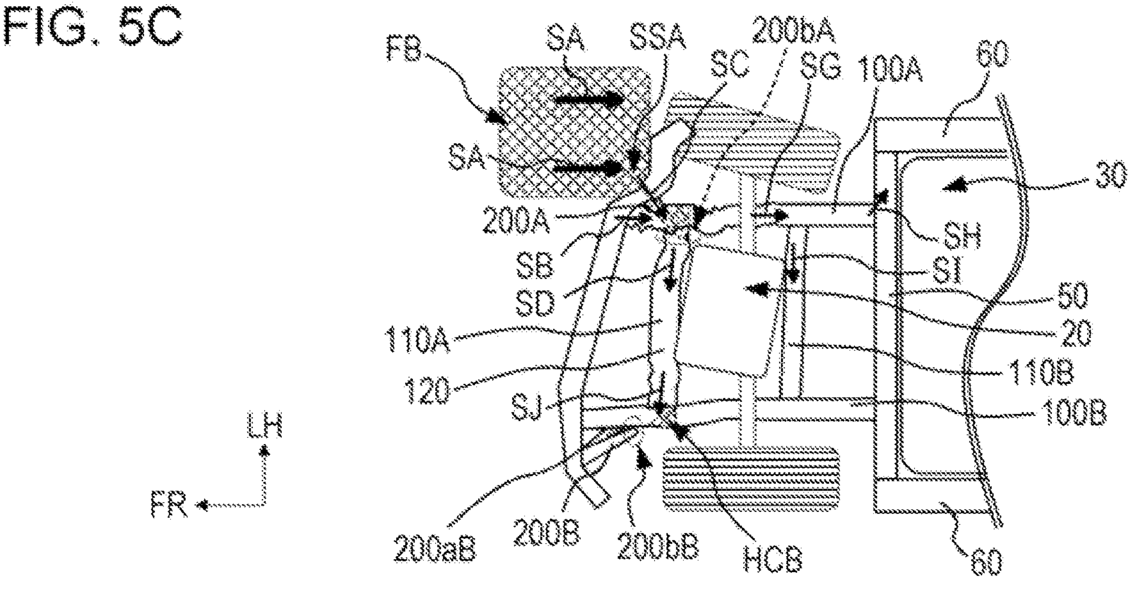

With a further increase of the collision energy, as illustrated in FIG. 5C, the collapse of the front side frame 100 progresses on the collision side up to the position of the cross-member 110A disposed in front of the power unit 20. The collision energy is further transmitted to the reinforcement 200 from the direction denoted by the arrow SC. Accordingly, the reinforcement 200 is forced to dig into the cross-member 110A while deforming the cross-member 110A and is fixed to the cross-member 110A. The collision energy denoted by the arrow SD is transmitted to the cross-member 110A, whereupon the cross-member 110A is further collapsed and deformed. Looking at an opposite side to the collision side, the front side frame 100B on the opposite side to the collision side is also deformed by the collision energy that is denoted by an arrow SJ and is transmitted to the front side frame 100B through the cross-member 110A.

In addition, the collision energy denoted by an arrow SG and transmitted toward the rear side in the vehicle through the front side frame 100 is distributed to a direction toward the cross-member 110B as denoted by an arrow SI and a direction toward the torque box 50 as denoted by an arrow SH.

As described above, the collision energy transmitted through the reinforcement 200 is transmitted to the robust well-shaped skeletons that are formed by joining the front side frame 100A and the front side frame 100B on both the sides in the vehicle width direction, the cross-member 110A and the cross-member 110B disposed respectively in front and rear of the power unit 20, the bumper beam 120, the torque box 50, and the side sills 60. Thus, the collision energy is distributed to the well-shaped skeletons and is absorbed by the deformations of the well-shaped skeletons.

When input of the collision energy is ended and the transmission of the collision energy to the front side frame 100 is ended, the absorption of the collision energy by the deformation of the vehicle body front structure S is ended.

The vehicle body front structure S according to the disclosure includes a pair of the front side frames 100 (the front side frame 100A on one side in the vehicle width direction and the front side frame 100B on the other side) extending in the front-rear direction of the vehicle on both sides of a front portion of the vehicle V in the vehicle width direction, the cross-member 110A and the cross-member 110B extending in the vehicle width direction on the front side in the vehicle and joining the front side frame 100A and the front side frame 100B, and the bumper beam 120 joining the vehicle front-side end of the front side frame 100A and the vehicle front-side end of the front side frame 100B, extending in the vehicle width direction, and having both end portions formed as bent portions toward the rear side in the vehicle. The vehicle body front structure further includes the reinforcement 200 having the triangular shape and including the bottom portion BT joined to the bumper beam 120 and the tip portion 200*b* protruding toward the inner rear side of the vehicle, and the fixing bracket 200*a* fixing the reinforcement 200 to each of the front side frames 100. The tip portion 200*b* of the reinforcement 200 has the D-shape including the rounded shape that extends in the up-down direction of the vehicle, and the axial direction SS of the reinforcement 200 fixed to the front side frame 100 intersects the outer surface of the front side frame 100 in the vehicle width direction at the position on the side closer to the front of the vehicle than the joined portion CN between the front side frame 100 and the cross-member 110A.

In the event of the full-wrap collision, the collision energy toward the rear side in the vehicle is transmitted to the reinforcement 200. Because the tip portion 200*b* of the reinforcement 200 has the D-like tip shape, the tip portion 200*b* is smoothly pushed toward the rear side in the vehicle along the vehicle outer-side surface of the front side frame 100. Accordingly, the fixing bracket 200*a* is disengaged from the front side frame 100, and the tip portion 200*b* of the reinforcement 200 is guided, because of the loss of the fixing shaft, to the position at which the tip portion 200*b* does not take part in the absorption of the collision energy by the well-shaped skeletons. On the other hand, in the event of the small lap collision, the collision energy applied in the axial direction SS of the reinforcement 200 is transmitted to the reinforcement 200. The reinforcement 200 is forced to dig into the cross-member 110A and to be fixed there while deforming the front side frame 100.

Thus, in the event of the full-wrap collision, the vehicle body front structure S can move the reinforcement 200 to the position at which the reinforcement 200 does not take part in the absorption of the collision energy by the well-shaped skeletons. In the event of the small lap collision, the vehicle body front structure S can fix the reinforcement 200 to the cross-member 110A such that the collision energy can be distributed to the members optimum for the collision mode. Hence the vehicle body front structure S can distribute the collision energy to the members optimum for the collision mode and can absorb the collision energy inside the vehicle front compartment FA.

As a result, the deformations of the cabin CA and the battery pack 30 in the protection area PA can be suppressed.

Furthermore, in the vehicle body front structure S according to the embodiment, the front side frame 100 includes the reinforcing member HC disposed in the joined portion CN between the front side frame 100 and the cross-member 110A, the reinforcing member HC having the recess HS spanning from the front-side outer surface of the front side frame 100 in the vehicle width direction to the rear-side inner surface of the front side frame 100 in the vehicle width direction.

In the event of the small overlap collision, because the axial direction SS of the reinforcement 200 is oriented to the position closer to the front side in the vehicle than the reinforcing member HC, the tip portion 200*b* of the reinforcement 200 is brought into contact with the recess HS of the reinforcing member HC disposed within the front side frame 100. The reinforcing member HC guides the reinforcement 200 toward the cross-member 110A with the presence of the recess HS, thereby causing the reinforcement 200 to be fixed to the cross-member 110A.

Stated another way, since the reinforcing member HC guides the reinforcement 200 toward the cross-member 110A with the presence of the recess HS such that the reinforcement 200 is reliably fixed to the cross-member 110A, the vehicle body front structure S can distribute the collision energy to the front side frame 100B on the other side to the collision side. Hence the vehicle body front structure S can distribute the collision energy to the members optimum for the collision mode and can absorb the collision energy inside the vehicle front compartment FA.

As a result, the deformations of the cabin CA and the battery pack 30 in the protection area PA can be suppressed.

Thus, the embodiment of the disclosure can provide the vehicle body front structure capable of suppressing the deformations of the cabin and the battery pack in any of multiple frontal collision modes.

While the embodiment of the disclosure has been described in detail above with reference to the drawings, practical configurations are not limited to those described in the above embodiment, and other designs and so on not departing from the gist of the disclosure also fall within the scope of the disclosure.

The invention claimed is:

1. A vehicle body front structure comprising:

front side frames in a pair, the front side frames extending in a front-rear direction of a vehicle on both sides of a front of the vehicle in a vehicle width direction;

a cross-member extending in the vehicle width direction on a front side of the vehicle and joined to the front side frames, the cross-member configured for transferring collision forces between the front side frames;

a bumper beam joined to respective vehicle front-side ends of the front side frames, the bumper beam extending in the vehicle width direction and including both end portions serving as bent portions toward a rear side of the vehicle;

reinforcements having a triangular shape, the reinforcements each including a bottom portion joined to the bumper beam inward of an adjacent most one of the bent portions and a tip portion protruding toward an inner rear side of the vehicle; and fixing brackets fixing the reinforcements to the front side frames respectively, wherein the tip portion of each of the reinforcements has a D-shape including a rounded shape that extends in an up-down direction of the vehicle, and an axial direction of each of the reinforcements fixed to a corresponding one of the front side frames intersects an outer surface of the corresponding one of the front side frames in the vehicle width direction at a position on a side closer to the front of the vehicle than a joined portion between the corresponding one of the front side frames and the cross-member.

2. The vehicle body front structure according to claim 1, wherein each of the front side frames includes a reinforcing member disposed in a joined portion between each of the front side frames and the cross-member to extend from a vehicle rear-side position of the joined portion to an inside of the joined portion, the reinforcing member having a recess spanning from a front-side outer surface of each of the front side frames in the vehicle width direction to a rear-side inner surface of each of the front side frames in the vehicle width direction.

3. The vehicle body front structure according to claim 1, wherein the bottom portion is flush with the bumper beam over a linear length of the base of the triangular shaped reinforcement.

4. The vehicle body front structure according to claim 3, wherein the bottom portion is welded to the bumper beam over a linear length of the base of the triangular shaped reinforcement.

5. The vehicle body front structure according to claim 1, wherein in addition to the cross-member extending in the vehicle width direction on the front side of the vehicle and joined to the front side frames there is another cross-member extending in the vehicle width direction that is more rearward of the cross-member, and in conjunction with the cross-member and the front side frames, define an electric motor installation space.

6. The vehicle body front structure according to claim 1, wherein each fixing bracket comprises a V-shape bent metal plate with a first plate section fixed to a respective one of the front side frames and a second plate section fixed to an inner side wall of a respective one of the triangular shaped reinforcements.

7. The vehicle body front structure according to claim 6, wherein the first plate section includes an elongated hole through which a bolt extends into a receiving one of the front side frames, with the bolt designed for break off upon displacement of the first plate section relative to the receiving one of the front side frames.

8. A vehicle body front structure comprising:
- front side frames in a pair, the front side frames extending in a front-rear direction of a vehicle on both sides of a front of the vehicle in a vehicle width direction;
- a cross-member extending in the vehicle width direction on a front side of the vehicle and joined to the front side frames;
- a bumper beam joined to respective vehicle front-side ends of the front side frames, the bumper beam extending in the vehicle width direction and including both end portions serving as bent portions toward a rear side of the vehicle;
- reinforcements having a triangular shape, the reinforcements each including a bottom portion joined to the bumper beam inward of an adjacent most one of the bent portions and a tip portion protruding toward an inner rear side of the vehicle; and
- fixing brackets fixing the reinforcements to the front side frames respectively,
- wherein the tip portion of each of the reinforcements has a D-shape including a rounded shape that extends in an up-down direction of the vehicle, and
- an axial direction of each of the reinforcements fixed to a corresponding one of the front side frames intersects an outer surface of the corresponding one of the front side frames in the vehicle width direction at a position on a side closer to the front of the vehicle than a joined portion between the corresponding one of the front side frames and the cross-member, and
- wherein the bottom portion defines a base of the triangular shaped reinforcement and that base is fixedly secured along a length thereof to the bumper beam, and the base is of a lesser length than each side wall of the triangular shaped reinforcement that converge to the tip portion.

9. The vehicle body front structure according to claim 8, wherein the bottom portion is flush with the bumper beam over a linear length of the base of the triangular shaped reinforcement.

10. The vehicle body front structure according to claim 9, wherein the bottom portion is welded to the bumper beam.

11. The vehicle body front structure according to claim 8, wherein each of the front side frames includes a reinforcing member disposed in a joined portion between each of the front side frames and the cross-member to extend from a vehicle rear-side position of the joined portion to an inside of the joined portion, the reinforcing member having a recess spanning from a front-side outer surface of each of the front side frames in the vehicle width direction to a rear-side inner surface of each of the front side frames in the vehicle width direction.

12. The vehicle body front structure according to claim 8, wherein in addition to the cross-member extending in the vehicle width direction on the front side of the vehicle and joined to the front side frames there is another cross-member extending in the vehicle width direction that is more rearward of the cross-member, and in conjunction with the cross-member and the front side frames, define an electric vehicle driving power unit installation space.

13. The vehicle body front structure according to claim 8, wherein each fixing bracket comprises a V-shape bent metal plate with a first plate section fixed to a respective one of the front side frames and a second plate section fixed to an inner side wall of the side walls of a respective one of the triangular shaped reinforcements.

14. A vehicle body front structure comprising:
- front side frames in a pair, the front side frames extending in a front-rear direction of a vehicle on both sides of a front of the vehicle in a vehicle width direction;
- a cross-member extending in the vehicle width direction on a front side of the vehicle and joined to the front side frames;
- a bumper beam joined to respective vehicle front-side ends of the front side frames, the bumper beam extending in the vehicle width direction and including both end portions serving as bent portions toward a rear side of the vehicle;
- reinforcements having a triangular shape, the reinforcements each including a bottom portion joined to the bumper beam inward of an adjacent most one of the bent portions and a tip portion protruding toward an inner rear side of the vehicle, wherein, while in a pre-collision state, a bottom-to-tip vector line residing along a lengthwise central axis of each reinforcement extends both rearward and inward of the vehicle; and
- fixing brackets fixing the reinforcements to the front side frames respectively,
- wherein the tip portion of each of the reinforcements has a D-shape including a rounded shape that extends in an up-down direction of the vehicle, and
- the axis of each of the reinforcements fixed to a corresponding one of the front side frames intersects an outer surface of the corresponding one of the front side frames in the vehicle width direction at a position on a side closer to the front of the vehicle than a joined portion between the corresponding one of the front side frames and the cross-member.

15. The vehicle body front structure according to claim 14, wherein the bottom portion is flush with the bumper beam over a linear length of the base of the triangular shaped reinforcement.

16. The vehicle body front structure according to claim 15, wherein the bottom portion is welded to the bumper beam over a linear length of the base of the triangular shaped reinforcement.

17. The vehicle body front structure according to claim 14, wherein in addition to the cross-member extending in the vehicle width direction on the front side of the vehicle and joined to the front side frames there is another cross-member extending in the vehicle width direction that is more rearward of the cross-member, and in conjunction with the cross-member and the front side frames, define an electric vehicle driving power unit installation space.

18. The vehicle body front structure according to claim 14, wherein each fixing bracket comprises a V-shape bent metal plate with a first plate section fixed to a respective one of the front side frames and a second plate section fixed to an inner side wall of a respective one of the triangular shaped reinforcements.

* * * * *